(12) United States Patent
Aston et al.

(10) Patent No.: US 9,913,463 B2
(45) Date of Patent: Mar. 13, 2018

(54) FISHING-HOOK-RETENTION METHOD

(71) Applicants: Kenneth I. Aston, North Salt Lake, UT (US); Timothy G. Jenkins, Saratoga Springs, UT (US); Eric E. Aston, Farmington, UT (US)

(72) Inventors: Kenneth I. Aston, North Salt Lake, UT (US); Timothy G. Jenkins, Saratoga Springs, UT (US); Eric E. Aston, Farmington, UT (US)

(73) Assignee: Tacky Fishing LLC, Saratoga Springs, UT (US)

( * ) Notice: Subject to any disclaimer, the term of this patent is extended or adjusted under 35 U.S.C. 154(b) by 95 days.

(21) Appl. No.: 15/084,162

(22) Filed: Mar. 29, 2016

(65) Prior Publication Data
US 2016/0205913 A1    Jul. 21, 2016

Related U.S. Application Data

(63) Continuation of application No. 14/547,037, filed on Nov. 18, 2014.
(Continued)

(51) Int. Cl.
*A01K 97/06*    (2006.01)
*B29C 69/00*    (2006.01)
(Continued)

(52) U.S. Cl.
CPC ............ *A01K 97/06* (2013.01); *B29C 69/001* (2013.01); *B29K 2083/00* (2013.01); *B29L 2031/7002* (2013.01)

(58) Field of Classification Search
CPC .................................................... A01K 97/06
(Continued)

(56) References Cited

U.S. PATENT DOCUMENTS 435,094 A * 8/1890 Hewitt ................... A01K 97/06
43/57.2
1,133,542 A * 3/1915 Deal ....................... A01K 97/06
43/57.1
(Continued)

FOREIGN PATENT DOCUMENTS

JP    09172931 A *   7/1997
JP    2003111548 A *   4/2003

OTHER PUBLICATIONS

Gink and Gasoline, Pickett, Justin, "The Tacky Fly Box, It's Been Quite Some Time Since There Has Been Any Kind of Advancement in the Fly Box", Oct. 20, 2015; Available web site: http://www.ginkandgasoline.com/gear_reviews/the-tacky-fly-box/; downloaded on Nov. 2, 2017.*
(Continued)

*Primary Examiner* — Darren W Ark
(74) *Attorney, Agent, or Firm* — Warren M. Pate; Pate Peterson, PLLC

(57) ABSTRACT

A method for forming a fishing-hook-retention system is disclosed. The method may include molding a sheet of silicone rubber to include at least one indentation. The at least one indentation may extend at least partially through a thickness of the sheet of silicone rubber. After the molding, at least one slit may be cut into the sheet of silicone rubber. The at least one slit may have one end terminating in the at least one indentation. Thereafter, the sheet of silicone rubber may be used to retain and storing one or more fishing hooks. This may be accomplished by placing at least a portion of a fishing hook within the at least one slit. The sheet silicone rubber may therefore grip the fishing hook and prevent it from falling out of the at least one slit.

20 Claims, 22 Drawing Sheets

Related U.S. Application Data

(60) Provisional application No. 61/962,785, filed on Nov. 18, 2013.

(51) Int. Cl.
B29K 83/00 (2006.01)
B29L 31/00 (2006.01)

(58) Field of Classification Search
USPC ............ 43/54.1, 57.1, 57.2; 206/315.11, 6.1, 206/566; 224/920
See application file for complete search history.

(56) References Cited

U.S. PATENT DOCUMENTS

| | | | | |
|---|---|---|---|---|
| 1,305,241 A * | 5/1919 | Hendry | .................... | B65D 1/36 206/566 |
| 1,815,568 A * | 7/1931 | Jacqmein | ............... | A01K 97/06 206/315.11 |
| 1,954,127 A * | 4/1934 | Harsted | .................. | A01K 97/06 43/57.1 |
| 2,065,234 A * | 12/1936 | Martinez | ............... | A01K 97/06 206/315.11 |
| 2,208,649 A * | 7/1940 | Strom | .................... | A01K 97/06 43/57.2 |
| 2,610,430 A * | 9/1952 | Neiman | .................. | A01K 97/06 43/57.1 |
| 2,797,806 A * | 7/1957 | Davis | .................... | A45C 11/16 206/566 |
| 2,861,682 A * | 11/1958 | Hatcher | .................... | A47F 7/02 206/566 |
| 2,978,830 A * | 4/1961 | Killian | ................... | A01K 97/06 43/57.1 |
| 3,121,970 A * | 2/1964 | Oakes | .................... | A01K 97/06 43/57.1 |
| 3,461,599 A * | 8/1969 | Sylvester | ............... | A01K 97/06 43/57.1 |
| 3,507,071 A * | 4/1970 | Bryson | .................. | A01K 97/06 43/57.1 |
| 3,769,741 A * | 11/1973 | Hessler | .................. | A01K 97/06 206/315.11 |
| 3,881,273 A * | 5/1975 | Herring | .................. | A01K 97/06 43/57.1 |
| 4,139,096 A * | 2/1979 | Sieger | .................... | A01K 97/06 206/315.11 |
| 4,176,491 A * | 12/1979 | Herring | .................. | A01K 97/06 43/57.1 |
| 4,186,511 A * | 2/1980 | Slacter | ................... | A01K 97/06 224/406 |
| 4,240,222 A * | 12/1980 | Covington | ............. | A01K 97/06 206/315.11 |
| 4,281,470 A * | 8/1981 | Anderson | ............... | A01K 97/06 224/920 |
| 4,282,975 A * | 8/1981 | Ovadia | .................... | A47F 7/02 206/566 |
| 4,287,987 A * | 9/1981 | Hoffman | .......... | A61B 17/06133 43/57.1 |
| 4,514,928 A * | 5/1985 | Hanson | .................. | A01K 97/06 43/57.2 |
| 4,631,856 A * | 12/1986 | Born | ...................... | A01K 97/06 206/315.11 |
| 4,769,941 A * | 9/1988 | Schmidt | ................. | A01K 97/06 43/57.1 |
| 4,883,238 A * | 11/1989 | Harder | ................. | A01K 89/016 24/127 |
| 4,995,577 A * | 2/1991 | Wood | .................... | A01K 97/06 248/205.3 |
| 5,505,294 A * | 4/1996 | Kilmartin, III | ........... | A47F 7/02 206/566 |
| 5,555,671 A * | 9/1996 | Voight | ................... | A01K 97/06 206/315.11 |
| 5,941,007 A * | 8/1999 | Reinhold | ............... | A01K 97/26 24/563 |
| 6,059,115 A * | 5/2000 | Ovadia | .................. | A45C 11/16 206/566 |
| 6,079,148 A * | 6/2000 | Yonenoi | ................. | A01K 97/06 43/57.1 |
| 6,694,667 B2 * | 2/2004 | Davis | ..................... | A01K 97/06 225/47 |
| 6,766,610 B1 * | 7/2004 | Lin | ......................... | A01K 97/06 206/315.11 |
| 7,168,204 B2 * | 1/2007 | Wieringa | ............... | A01K 97/06 206/315.11 |
| 7,748,158 B2 * | 7/2010 | Wieringa | ............... | A01K 97/06 206/315.11 |
| 7,766,168 B2 * | 8/2010 | Thrapp | ................... | A45F 5/021 206/315.11 |
| 8,458,951 B2 * | 6/2013 | Taylor | .................... | A01K 97/06 43/54.1 |
| D696,348 S * | 12/2013 | Dilker | ......................... | D19/113 |
| 8,607,970 B2 * | 12/2013 | De Lecce | ............... | A47F 7/024 206/566 |
| 8,695,273 B2 * | 4/2014 | Smith | .................... | A01K 97/06 24/570 |
| 9,320,267 B2 * | 4/2016 | Smith | .................... | A01K 97/06 |
| 9,468,202 B2 * | 10/2016 | Saunders | ............... | A01K 97/06 |
| 2007/0175084 A1 * | 8/2007 | Moffitt | ................. | A01K 85/005 43/42.25 |
| 2008/0289988 A1 * | 11/2008 | Sorensen | ............... | A01K 97/06 206/486 |
| 2009/0119974 A1 * | 5/2009 | Rieux | .................... | A01K 97/06 43/57.2 |
| 2010/0170139 A1 * | 7/2010 | Zhou | ..................... | A01K 97/06 43/54.1 |
| 2013/0299363 A1 * | 11/2013 | De Lecce | ................. | A47F 3/14 206/6.1 |
| 2016/0015017 A1 * | 1/2016 | Heaton | .................. | A01K 97/06 43/54.1 |
| 2017/0086441 A1 * | 3/2017 | Stanley | .................. | A01K 85/08 |
| 2017/0325441 A1 * | 11/2017 | Martin | .................. | A01K 97/06 |

OTHER PUBLICATIONS

Deneki Outdoors, "Tacky Big Bug Fly Boxes", Dec. 28, 2016; Available web site: https://www.deneki.com/2016/12/tacky-big-bug-fly-boxes/; downloaded on Nov. 2, 2017.*
AVIDMAX, Laehr, Brady, "Tackly Fly Boxes: How They Changed the Way I Store My Flies", Jul. 1, 2016; Available web site: https://blog.avidmax.com/2016/07/01/how-tacky-fly-boxes-changed-how-i-store-my-flies/; downloaded on Nov. 2, 2017.*
Gray's Sporting Journal, The Magazine for Discerning Sportsmen, "Gray's Best Awards 2016, Angling: Tacky Fly Box", Jun. 14, 2016; Available web site: https://www.grayssportingjournal.com/grays-best-awards-2016/3/; downloaded on Nov. 2017.*
Gear Junkie, McGlothlin, Jessica, "First Look: 'Tacky' Silicone Fly Box", Sep. 18, 2014; Available web site: https://gearjunkie.com/tacky-fly-box-fishing-review; downloaded on Nov. 2, 2017.*
Fly Fish Food, Fry, Curtis, "Review: Tacky Fly Box, A New Concept in Fly Storage"; Available web site: http://www.flyfishfood.com/2014/06/review-tacky-fly-box.html; downloaded on Nov. 2, 2017.*
SaltwaterFlies.com's Fly Shop!, http://www.saltwaterflies.com,toystore.html, accessed Sep. 24, 2015, pp. 1-15.
Anglers Image Photograph, http://www.saltwaterflies.com, accessed on or about Nov. 7, 2014, p. 1.
FHF Fishing, http://fhfgear.com/fishing/fly-boxes, accessed Sep. 24, 2015, pp. 1-4.
FHFGear Photograph, http://www.fhfgear.com, accessed on or about Apr. 30, 2015, p. 1.
C&F Design, http://www.anglersportgroup.com/c-f-design, accessed Sep. 24, 2015, p. 1.
C&F Design Threader Box Photograph, http://www.anglersportgroup.com, accessed on or about Apr. 30, 2015, p. 1.
Bug Luggage, http://bugluggage.com/products.html, accessed Sep. 24, 2015, pp. 1-2.
Bug Luggage Photograph, http://bugluggage.com, accessed on or about Nov. 7, 2014, p. 1.

(56) References Cited

OTHER PUBLICATIONS

Cliff's Bugger Barn, http://www.cliffoutdoors.com/index.php?page=the-bugger-barn, accessed Sep. 24, 2015, pp. 1-2.
The Bugger Barn Photograph, http://cliffoutdoors.com, accessed on or about Apr. 30, 2015, p. 1.
Brook Fishing Equipment, http://www.brookfishingequipment.com, accessed Sep. 24, 2015, pp. 1-2.
Brook Fishing Equipment Photograph, http://www.brookfishingequipment.com, accessed on or about Nov. 7, 2014, p. 1.
Brook Fishing Equipment Silicone Inserts, http://www.brookfishingequipment.com/silicone-inserts, accessed Dec. 1, 2015, pp. 1-2.
HiFly Shop Photograph, online publisher unknown, accessed on or about Nov. 7, 2014, p. 1.

\* cited by examiner

US 9,913,463 B2

FISHING-HOOK-RETENTION METHOD

RELATED APPLICATIONS

This application is a continuation of U.S. patent application Ser. No. 14/547,037 filed Nov. 18, 2014, which claims the benefit of U.S. Provisional Patent Application Ser. No. 61/962,785 filed Nov. 18, 2013. U.S. patent application Ser. No. 14/547,037 and U.S. Provisional Patent Application Ser. No. 61/962,785 are both hereby incorporated by reference.

BACKGROUND

Field of the Invention

This disclosure relates to fishing products and more particularly to systems and methods for retaining and storing fishing lures, fishing hooks, and artificial fishing flies.

Background of the Invention

In the past, fishing tackle in the form of fishing lures, hooks, and artificial flies have often been stored in various compartments of a box. Such tackle has also been stored by inserting hooks into foam contained within a box. Both these approaches have significant drawbacks. For example, when multiple lures, hooks, or flies are stored in the same compartment, they will inevitably become entangled. Accordingly, before any lure, hook, or fly so stored may be used, it must be disentangled from the other tackle with which it has been stored. While inserting hooks in foam does help to keep lures, hooks, or flies separate, it has other problems. For example, with use, foam becomes compacted and loses the ability to resiliently return to its original shape. Accordingly, the ability of the foam to support or hold tackle degrades with time. In view of these drawbacks in current systems, what is needed are new systems and method for retaining and storing fishing tackle.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF SELECTED EMBODIMENTS

Figure 1:
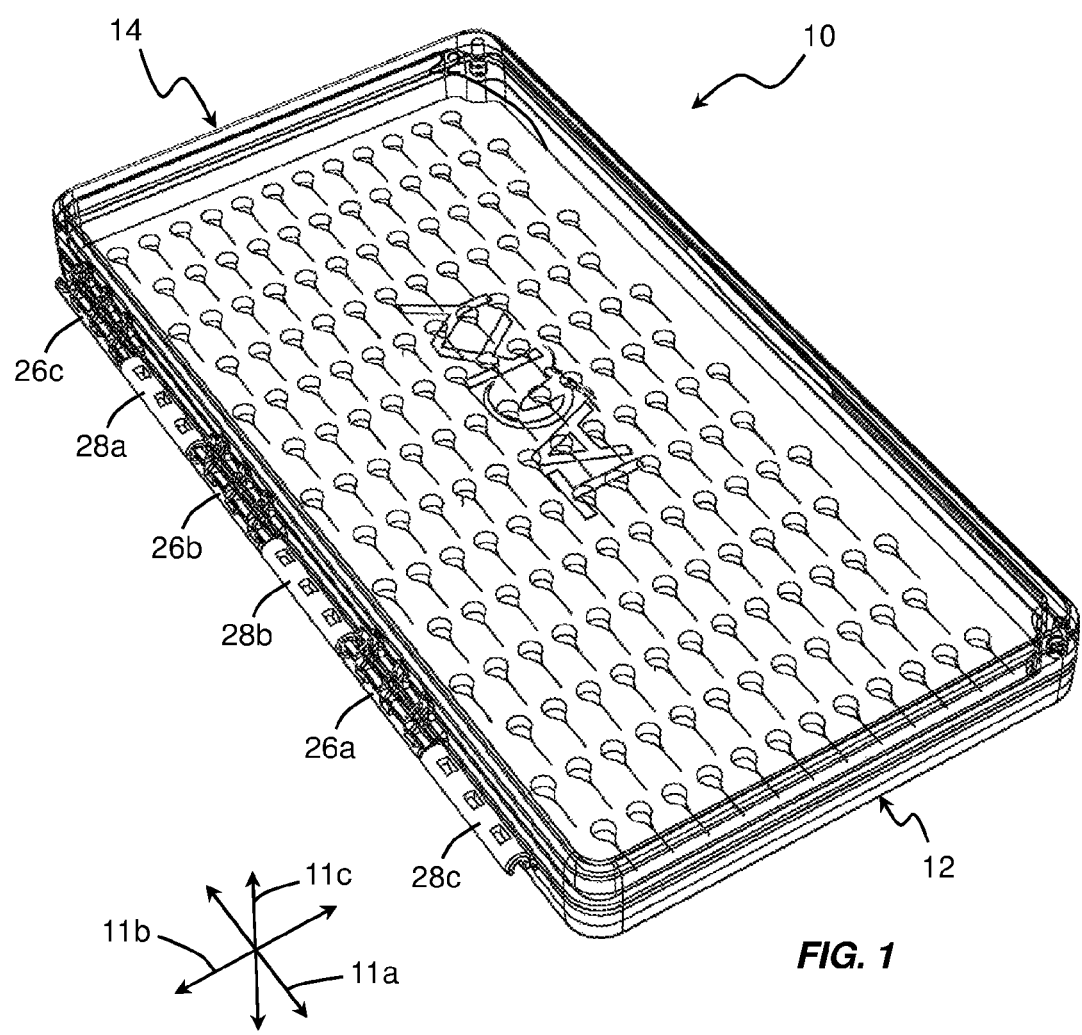
FIG. 1 is a perspective view of one embodiment of a fishing hook retention and storage apparatus in accordance with the present invention with the cover formed of a transparent material, the base formed of an opaque material, and the cover in a closed position.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIGS. 1-5, an apparatus or system in accordance with the present invention may be described in terms of longitudinal 11a, lateral 11b, and transverse 11c directions extending substantially orthogonally with respect to one another. Accordingly, in selected embodiments, an apparatus or system may comprise a box 10 having a length (e.g., a length of about 17 to about 19 centimeters) extending in a longitudinal direction 11a, a width (e.g., a width of about 9 to about 10 centimeters) in a lateral direction 11b, and a thickness (e.g., a thickness of about 1.5 to about 2 centimeters) in a transverse direction 11c.

In certain embodiments, a box 10 may include a base 12 and cover 14 and may house one or more inserts 16 (e.g., house one or more inserts 16 within a base 12, one or more inserts 16 within a cover 14, or some combination thereof). Each such insert 16 may, in turn, provide one or more locations for securing various fishing tackle (e.g., fishing hooks, lures, flies, or the like). A base 12 may form or comprise a container having an interior volume. For example, a base 12 may include a back panel 18 and various side walls 20 (e.g., four side walls 20a, 20b, 20c, 20d). The back panel 18 and side walls 20 may be connected (e.g., monolithically formed) together to form an open container. The interior length and width of the back panel 18 and the interior height of the side walls 20 may collectively define an interior volume corresponding to a base 12.

A cover 14 may also may form or comprise a container having an interior volume. For example, a cover 14 may include a front panel 22 and various side walls 24 (e.g., four side walls 24a, 24b, 24c, 24d). The front panel 22 and side walls 24 may be connected (e.g., monolithically formed) together to form an open container. The interior length and width of the front panel 22 and the interior height of the side walls 24 may collectively define an interior volume corresponding to a cover 14.

In selected embodiments, a cover 14 may pivotably engage a base 12. Accordingly, a cover 14 may pivot with respect to a base 12 through a range of motion. Such a range of motion may include a closed position at one extreme thereof and a fully open position at an opposite extreme thereof. When in the closed position, a cover 14 may cooperate with a base 12 to form an enclosure. Such an enclosure may have an overall interior volume comprising the interior volume corresponding to a cover 14 and the interior volume corresponding to a base 14. For example, an enclosure may have an overall volume equal or substantially equal to the sum of the interior volume corresponding to a cover 14 and the interior volume corresponding to a base 12.

A cover 14 may pivotably engage a base 12 in any suitable manner. In selected embodiments, a cover 14 may be pivotably connected to a base 12 via a barrel hinge. For example, one or more tubular members 26 or "barrels" 26 (e.g., three tubular members 26a, 26b, 26c) may connect to (or be monolithically formed with) a cover 14 (e.g., a side wall 24c of a cover 14). One or more complementary tubular members 28 or barrels 28 (e.g., three tubular members 28a, 28b, 28c) may connect to (or be monolithically formed with) a base 12 (e.g., a side wall 20c of a base 12). Accordingly, when the various tubular members 26, 28 of a cover 14 and base 12 are properly aligned, a hinge pin (e.g., a metal hinge pin) may be inserted through the tubular members 26, 28.

A hinge pin may maintain the tubular member 26, 28 in a proper alignment. However, the tubular members 26, 28 of one or both of a cover 14 and base 12 may be free to rotate or pivot with respect to the hinge pin. Accordingly, a cover 12 may be free to pivot through a range of motion with respect to a base 12.

A cover 14 may have an interior volume that is different from an interior volume of a corresponding base 12. Alternatively, a cover 14 may have an interior volume that is equal or substantially equal to an interior volume of a corresponding base 12. For example, in selected embodiments, a cover 14 may be substantially identical to (e.g., produced from the same mold as) a base 12. In such embodiments, the reversed orientation of a cover 14 with respect to a base 12 may enable any tubular members 26 or the like corresponding thereto to properly mesh and align with the tubular members 28 or the like of the base 12.

When in a closed position, a cover 14 may engage a base 12 to maintain an enclosure formed thereby securely closed. For example, in selected embodiments, a base 12 may comprise one or more first apertures 30 formed therein. One or more first magnets or magnetic material may be secured within the one or more first apertures 30. Similarly, a cover 14 may comprise one or more second apertures 32. One or more second magnets or magnetic material may be secured within the one or more second apertures 32. Moreover, the various apertures 30, 32 and corresponding magnets or magnetic material may be positioned such that they magnetically engage one another to secure the cover 14 and base 12 in a closed position.

In selected embodiments, a base 12 may have a first aperture 30 at the intersection of a first side wall 20a (e.g., a side wall 20 most distant from a hinge) and a second side wall 20b (e.g., a "top" side wall 20). A base 12 may also have a first aperture 30 at the intersection of the first side wall 20a and a third side wall 20d (e.g., a "bottom" side wall 20). At each such intersection, the corresponding side walls 20 may include or form a bulge 34 or widened region 34 to accommodate the first apertures 30 without compromising the strength of the base 12.

In like manner, a cover 14 may have a second aperture 32 at the intersection of a first side wall 24a (e.g., a side wall 24 most distant from a hinge) and a second side wall 24 (e.g., a "top" side wall 24). A cover 14 may also have a second aperture 32 at the intersection of the first side wall 24a and a third side wall 24d (e.g., a "bottom" side wall 24). At each such intersection, the corresponding side walls 24 may include or form a bulge 34 or widened region 34 to accommodate the second apertures 32 without compromising the strength of the cover 14.

In selected embodiments, the one or more first magnets or magnetic material may be positioned within the one or more first apertures 30 so as to be flush or sub-surface with respect to the surrounding material of the base 12. In like manner, the one or more second magnets or magnetic material may be positioned within the one or more second apertures 32 so as to be flush or sub-surface with respect to the surrounding material of the cover 12. As a result, the various magnets or magnetic material may not prevent the base 12 and cover 14 from abutting one another in a closed position.

The one or more first or second magnets or magnetic material may be secured within corresponding apertures 30, 32 in any suitable manner. In selected embodiments, the one or more first or second magnets or magnetic material may be press fit within corresponding apertures 30, 32. In other embodiments, the one or more first or second magnets or magnetic material may be secured within corresponding apertures 30, 32 by an adhesive, epoxy, or the like.

To assist in opening a box 10, one or both of a cover 14 and base 12 may include a grip 35. In selected embodiments, a grip 35 may include an indentation 36 bounded by or exposing a ledge 38 or shoulder 38. Accordingly, by engaging a ledge 38 or shoulder 38, a user may obtain sufficient purchase on the corresponding base 12 and/or cover 14 to open the box 10 (e.g., overcome a magnetic engagement securing a cover 14 and base 12 in a closed position).

A base 12 and cover 14 may be formed of any suitable material or combination of materials. In selected embodiments, a base 12 and cover 14 may each comprise a molded (e.g., injection molded) polymeric material. For example, a base 12 and cover 14 may each be molded in a polycarbonate material.

A base 12 and cover 14 may have differing transparency or opacity. For example, in selected embodiments, a base 12 may be opaque or substantially opaque while a cover 14 may be transparent or substantially transparent. A transparent cover 14 may enable a user to readily see what tackle is contained within the corresponding box 10 without having to first open the box 10.

A base 12 and cover 14 or portions thereof may have differing surface finishes. In certain embodiments, a base 12, cover 14, or selected portions thereof may have a textured, roughened, or "sand blasted" look or finish, while the other or other portions may have a smooth for glossy finish. For example, the exterior surfaces of the various side walls 20, 24 may have a roughened or "sand blasted" look or finish, while the exterior surfaces of the front and back panels 18, 22 may have a smooth or glossy finish. In certain embodiments, one or more surfaces of a base 12 or cover 14 may have an icon 40, trademark 40, or the like incorporated therewithin. For example, as shown in the illustrated embodiment, one or both of the exterior surfaces of the front and back panels 18, 22 may have a trademark 40 incorporated therewithin (e.g., molded therewithin).

An insert 16 in accordance with the present invention may provide an interface between one or more fishing lures, hooks, flies, or the like and some other structure. For example, an insert 16 may interface between one or more fishing lures, hooks, or flies and a box 10 in accordance with the present invention, some other box or container, a fishing vest, a workbench, or the like. In selected embodiments, an insert 16 may comprise multiple, discrete retention sites 42. Each such retention site 42 may comprise a portion of the insert 16 that is configured to individually engage or retain one piece of fishing tackle (e.g., one lure, hook, fly, or the like). For example, in certain embodiments, an insert 16 may be or comprise a planar sheet or strip (e.g., a sheet or strip having a flat face, flat back, and uniform thickness) secured to a base 12 (e.g., secured within a base 12) and having an array of retention sites 42 distributed thereon or therewithin.

An insert 16 may comprise a planar sheet or strip of urethane, neoprene rubber, natural rubber, or the like. In selected embodiments, an insert 16 may comprise a planar sheet or strip of silicone rubber. The silicone rubber may have a Shore hardness in the range of about 30 A to about 70 A, more preferably in the range from about 40 A to about 60 A, and most preferably about 50 A. Such an insert 16 may be secured to some other structure by adhering a back face of the planar sheet or strip to that structure. In certain embodiments, an insert 16 may be secured within a box 10 by adhering a back face of the planar sheet or strip to an interior surface of back panel 18. For example, an adhesive layer (e.g., a layer comprising a low surface energy adhesive) may directly interface between the silicone rubber and an interior surface of the back panel 18. In selected embodiments, an adhesive used to secure a sheet or strip of silicone rubber to the interior surface of the back panel 18 (or to some other structure) may be the 300LSE adhesive marketed by 3M. For example, a double-sided tape comprising the 300LSE adhesive may form an adhesive layer directly interfacing between a sheet or strip of silicone rubber and an interior surface of the back panel 18.

In certain embodiments, an insert 16 may comprise a planar sheet or strip having multiple, discrete retention sites 42 arranged in one or more rows 44. Each row 44 may include two or more retention sites 42. In selected embodiments, the retention sites 42 of one row 44a may be laterally offset (i.e., shifted in the lateral direction 11b) so as to not directly align with the retention sites 42 of an adjacent row 44b. For example, one row 44a may be laterally offset so that certain retention sites 42 thereof are laterally centered between (but offset in the longitudinal direction 11a with respect to) certain retention sites 42 of an adjacent row 44b.

One or more retention sites 42 of an insert 16 may comprise a slit 46 formed in a planar sheet or strip. For example, a retention site 42 may comprise a slit 46 having a depth extending completely through a planar sheet or strip in a transverse direction 11c and a length extending a selected distance (e.g., about 0.5 to about 0.8 centimeters) in a longitudinal direction 11a. In a neutral position or empty configuration, the sides of a slit 46 may abut one another or nearly abut one another. Accordingly, when a fishing hook (e.g., a hook of a lure, fly, or the like) or a portion thereof is inserted into the slit 46, the sides of the slit 46 may be pushed apart. A resiliency in the material forming the insert 16 (e.g., the material of a planar sheet or strip) may urge the sides of the slit 46 to return to the neutral or empty configuration. This urging may be a retaining force gripping the hook and preventing it from inadvertently exiting the slit 46.

One or more retention sites 42 of an insert 16 may further comprise a void 48 formed in a planar sheet or strip. For example, a retention site 42 may comprise a void 48 having a depth extending completely through a planar sheet or strip in a transverse direction 11c and a length extending a selected distance (e.g., about 0.3 to about 0.6 centimeters) in a longitudinal direction 11a and a width extending a selected distance (e.g., about 0.2 to about 0.5 centimeters) in a lateral direction 11b. In selected embodiments, a void 48 may enable a user to see through a planar sheet or strip to a back panel 18 (e.g., a back panel 18 therebelow or therebehind).

In certain embodiments, one end of a slit 46 of a retention site 42 may terminate in a void 48 corresponding to that retention site 42. Accordingly, a void 48 of a retention site 43 may assist a user in securing a fishing hook (e.g., a hook of a lure, fly, or the like) within a slit 46 corresponding to that retention site 42. For example, a void 48 may enable a user to better see where a hook or the like may be secured, as a slit 46 by itself may be more difficult to discern. Additionally, a void 48 may physically channel, guide, or direct a hook or the like into a slit 46, thereby making it easier for a user to secure the hook at a retention site 42.

In selected embodiments, a void 48 of a retention site 42 may be shaped and oriented to point toward or into a slit 46 corresponding to that retention site 42. For example, a void 48 may have a profile 50 like that of a tear drop 50a with the point thereof aligned with (e.g., pointed into) a corresponding slit 46. Other voids 48 may similarly point, but have other profiles 50 such as triangles 50b, diamonds 50c, or the like. Still other voids 48 may have a profile 50 like a circle 50d, ellipse 50e, half circle 50f, half ellipse 50g, rectangle 50h, square 50i, or the like.

One or more retention sites 42 of an insert 16 may comprise multiple slits 46 formed in a planar sheet or strip.

For example, a retention site 42 may comprise a first slit 46*a*, void 48, and second slit 46*b*. The first and second slits 46*a*, 46*b* may each have an end that terminates in the void 48. Additionally, the first and second slits 46*a*, 46*b* may be aligned and extend from opposite sides of the void 48. Each of the first and second slits 46*a*, 46*b* may have a depth extending completely through a planar sheet or strip in a transverse direction 11*c* and a length extending a selected distance (e.g., about 0.5 to about 0.8 centimeters) in a longitudinal direction 11*a*.

With a retention site 42 comprising multiple slits 46, a user may have multiple options with respect to how he or she will secure a corresponding fishing hook (e.g., a hook of a lure, fly, or the like) or a portion thereof in that retention site 42. For example, when first and second slits 46*a*, 46*b* are aligned and extend from opposite sides of a void 48, a user may either slide a hook forward into one slit 46*a* or backward into the other 46*b*. In either situation, a resiliency in the material forming the insert 16 (e.g., the material of a planar sheet or strip) may urge the sides of the selected slit 46*a*, 46*b* to return to the neutral or empty configuration. This urging may be a retaining force gripping the hook and preventing it from inadvertently exiting the selected slit 46*a*, 46*b*.

In selected embodiments, a void 48 of a multi-slit, retention site 42 may be shaped and oriented to point toward or into each slit 46*a*, 46*b* corresponding to that retention site 42. For example, a void 48 may have a profile 50 like that of a football 50*j* with each point thereof aligned with (e.g., pointed into) a different slit 46*a*, 46*b*. Alternatively, a void 48 of a multi-slit, retention site 42 may have some other profile 50, such as a diamond 50*c* with opposing points thereof aligned with or pointing into corresponding slits 46*a*, 46*b*. Still other voids 48 may have a profile 50 like a circle 50*d*, ellipse 50*e*, half circle 50*f*, half ellipse 50*g*, rectangle 50*h*, square 50*i*, or the like.

Each retention site 42 corresponding to an insert 16 or to a particular planar sheet or strip of an insert 16 may be discrete. Accordingly, the features (e.g., slits 46 and voids 48) of one retention site 42 may not contact the features of any adjacent retention sites 42. That is, an expanse 52 or portion 52 of material forming an insert 16 or planar sheet or strip thereof may separate each void 48 from all adjacent voids 48 and each slit 46 from all slits 46 of adjacent retention sites 42. For example, portions or features (e.g., first slits 46*a*) of retention sites 42 corresponding to one row 44 may overlap (e.g., overlap in a longitudinal directions 11*a*) portions or features (e.g., second slits 46*b*) of retention sites 42 of an adjacent row 44. However, despite any overlap, an expanse 52 or portion 52 of material forming an insert 16 or planar sheet or strip thereof may separate adjacent retention sites 42 so that each retention site 42 may be discrete.

Figure 2:
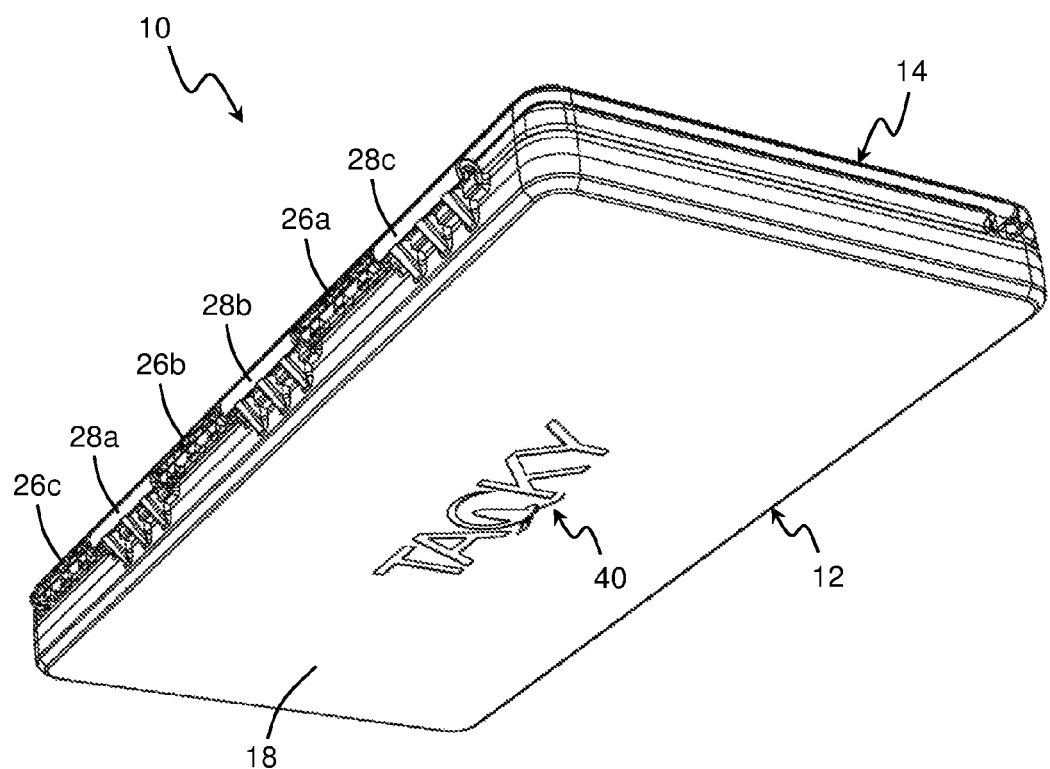
FIG. 2 is another perspective view of the apparatus of FIG. 1 with the cover in a closed position.
Figure 3:
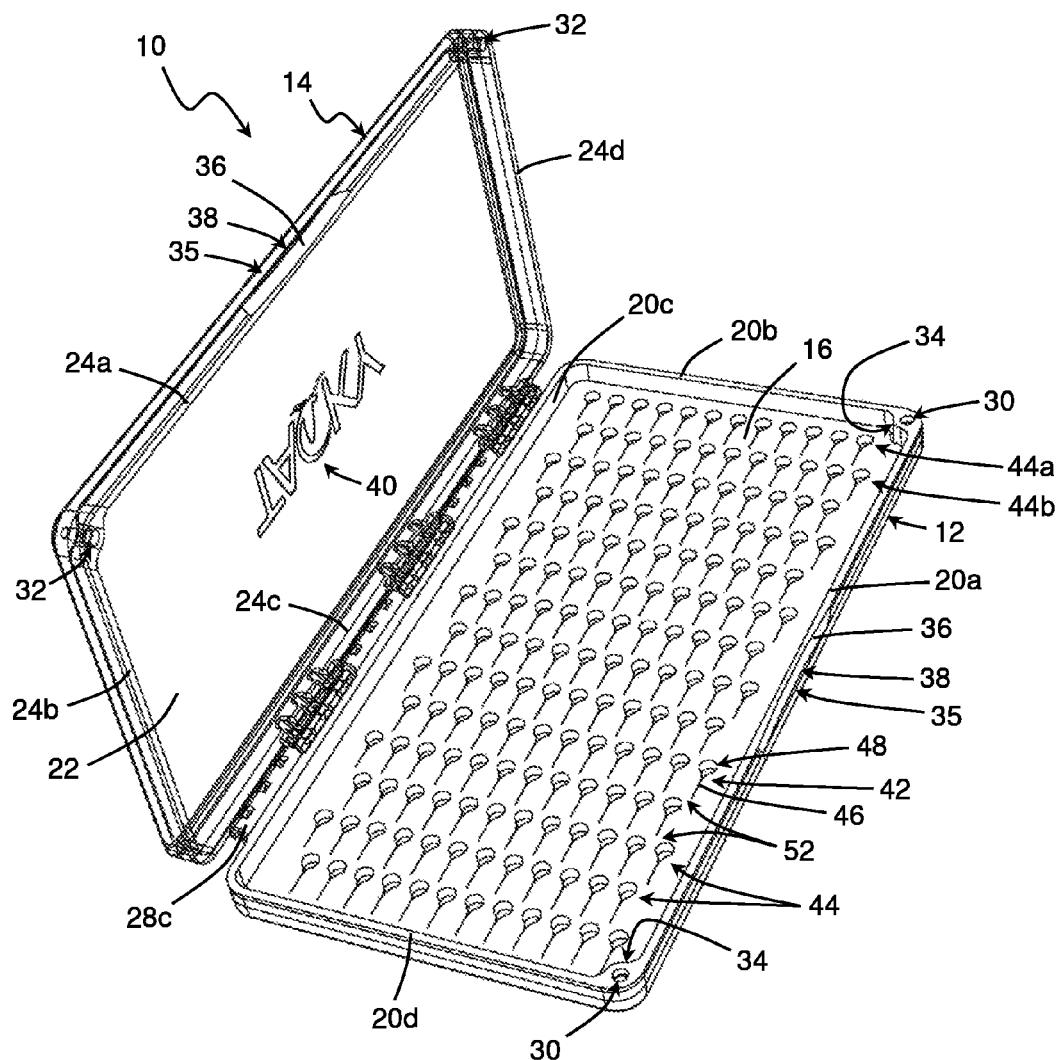
FIG. 3 is a perspective view of the apparatus of FIG. 1 with the cover in an open position.
Figure 4:
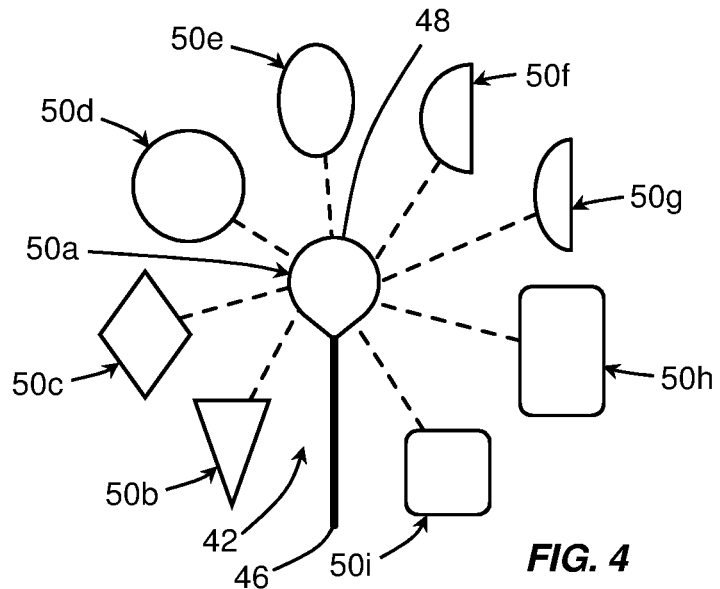
FIG. 4 is a top plan view of one embodiment of a retention site in accordance with the present invention shown in combination with various alternative profiles for the void portion of the retention site.
Figure 5:
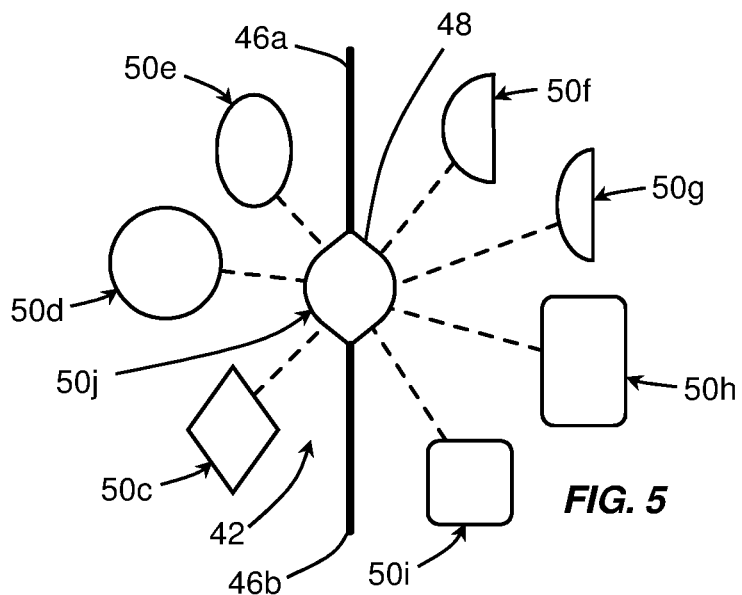
FIG. 5 is a top plan view of an alternative embodiment of a retention site in accordance with the present invention shown in combination with various alternative profiles for the void portion of the retention site.
Figure 6:
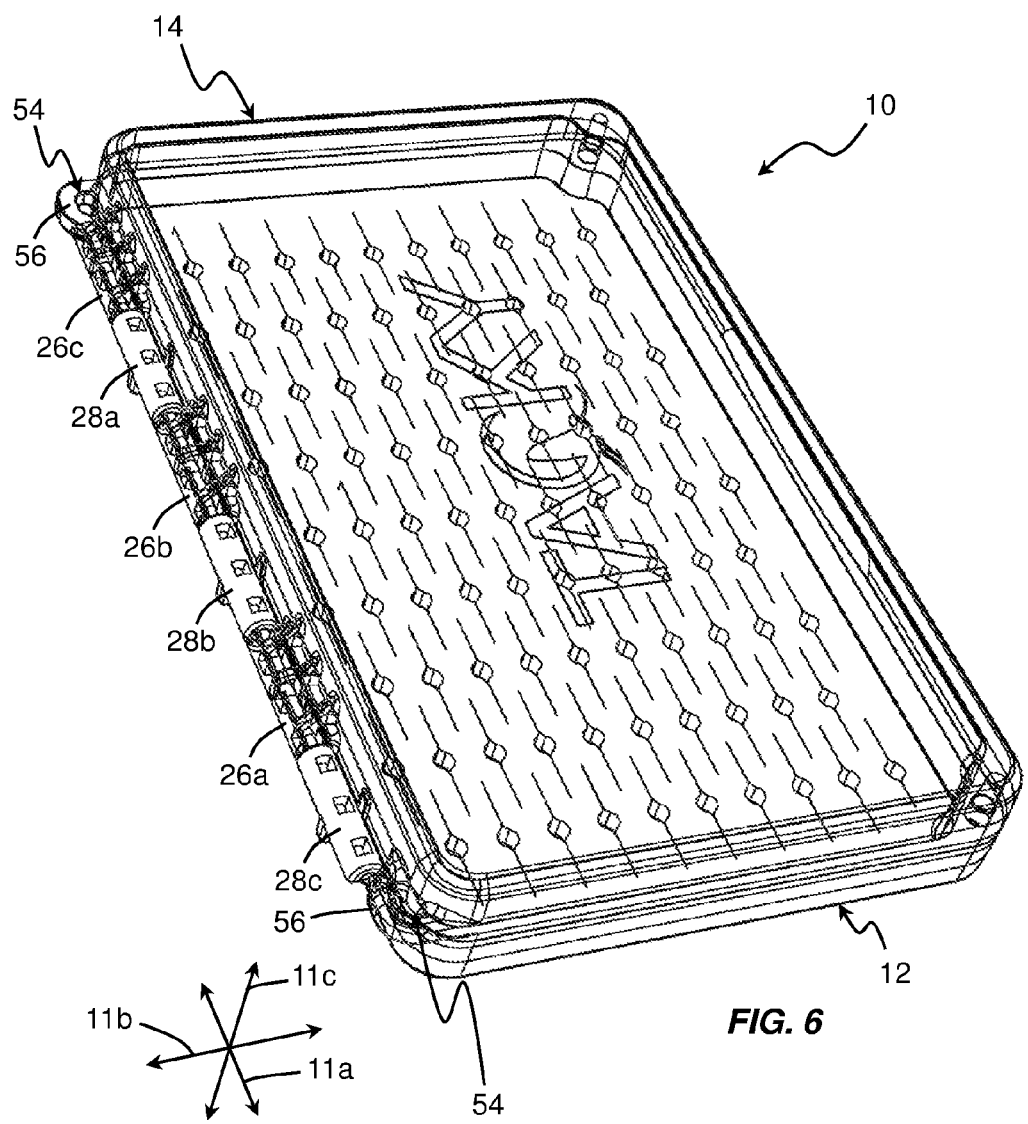
FIG. 6 is a perspective view of an alternative embodiment of a fishing hook retention and storage apparatus in accordance with the present invention with the cover formed of a transparent material, the base formed of an opaque material, and the cover in a closed position.
Figure 7:
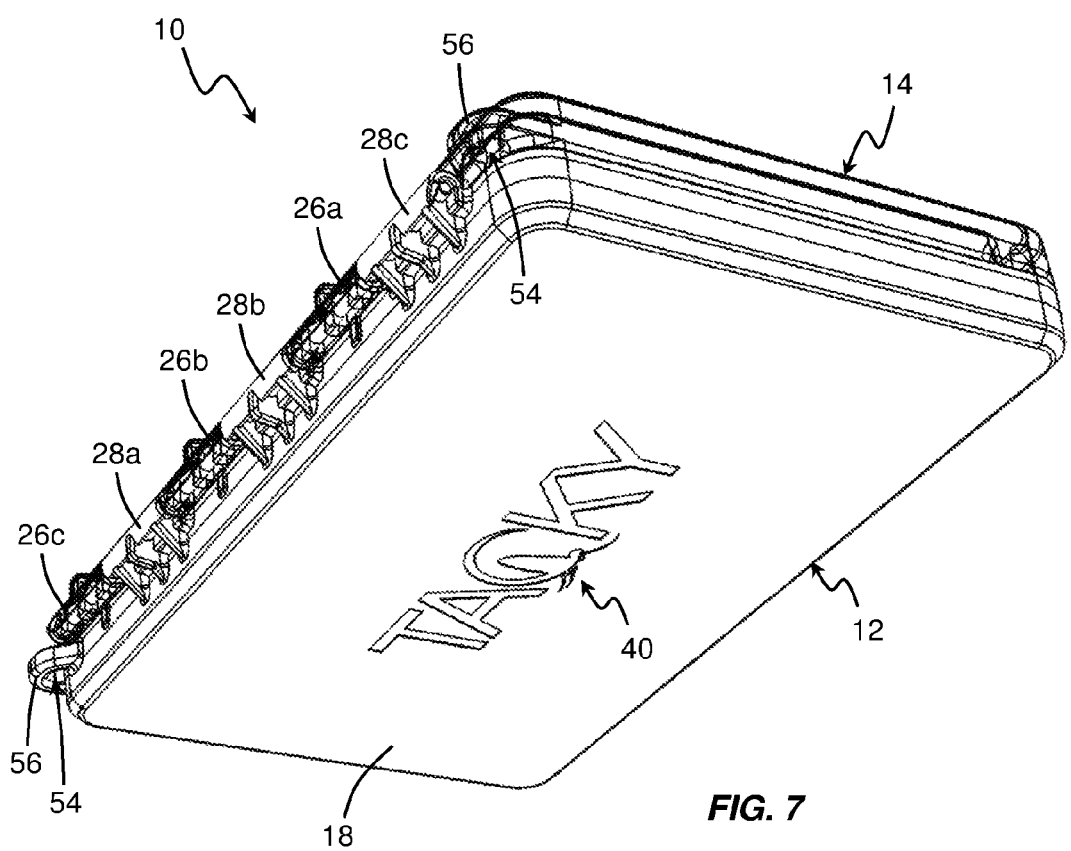
FIG. 7 is another perspective view of the apparatus of FIG. 6 with the cover in a closed position.
Figure 8:
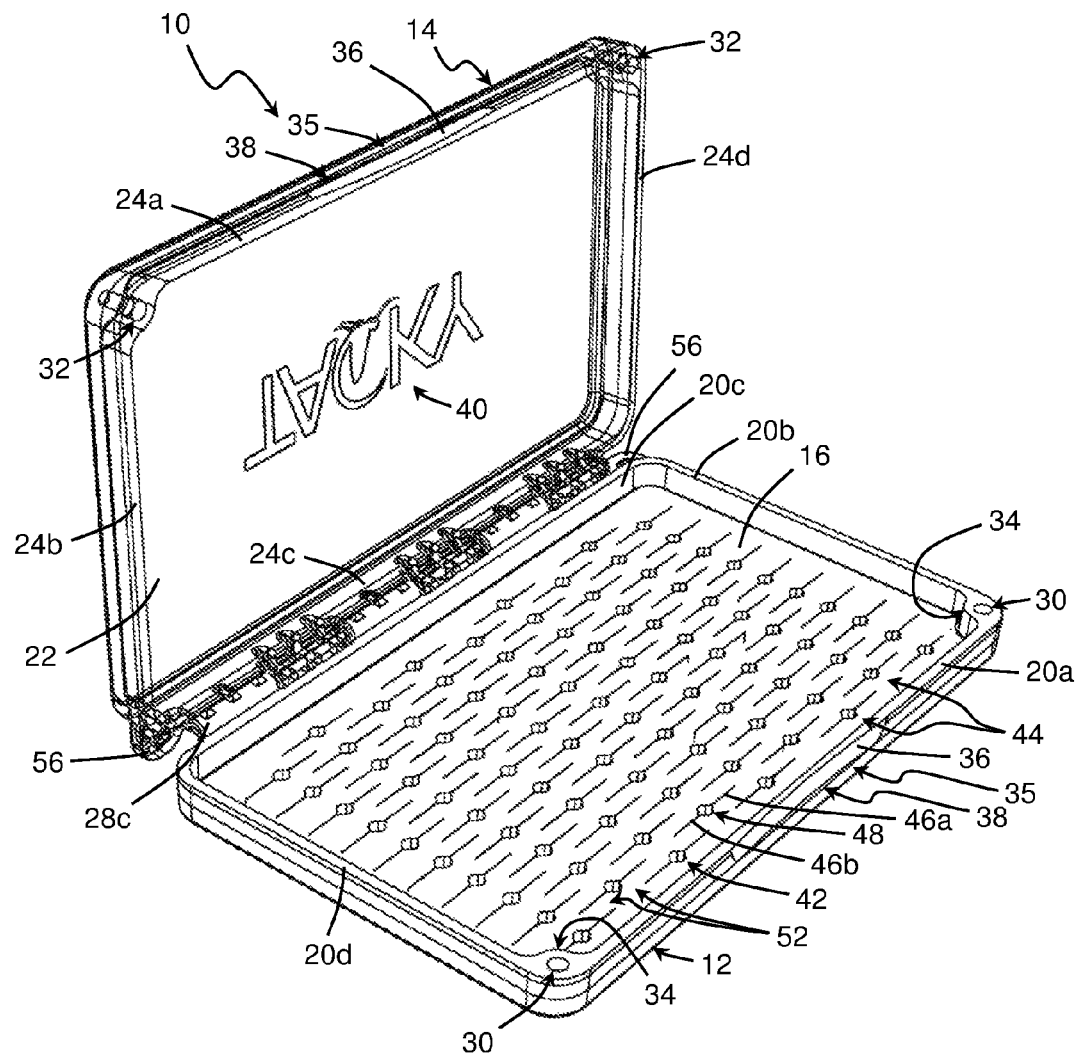
FIG. 8 is a perspective view of the apparatus of FIG. 6 with the cover in an open position.
Figure 9:
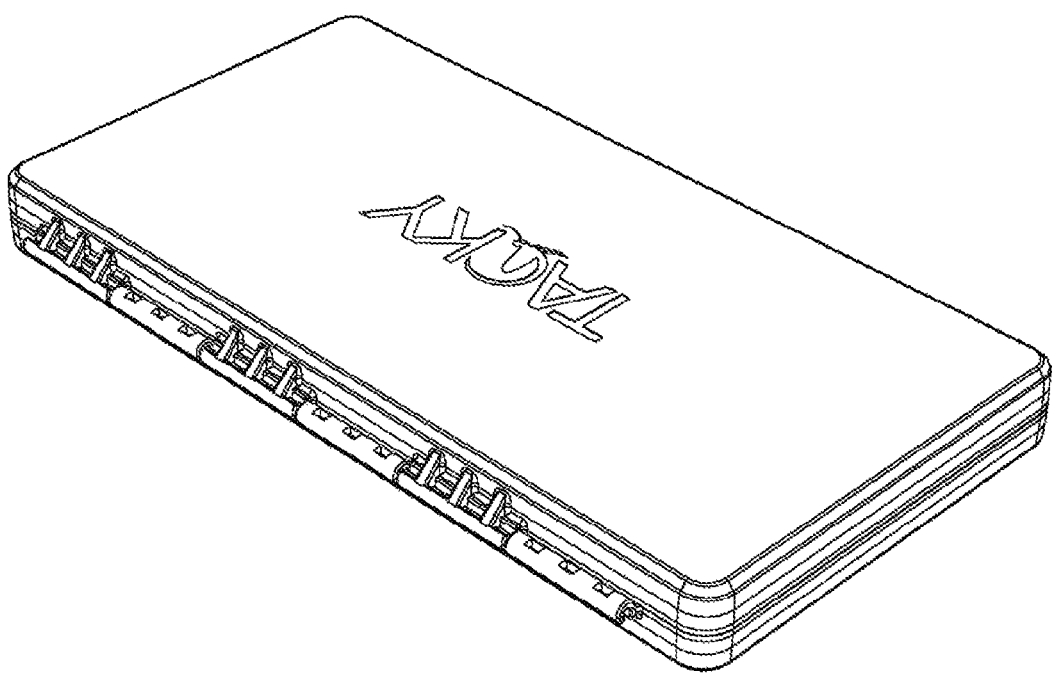
FIG. 9 is a perspective view of the apparatus of FIG. 1 with the cover and base formed of an opaque material and the cover in a closed position.
Figure 10:
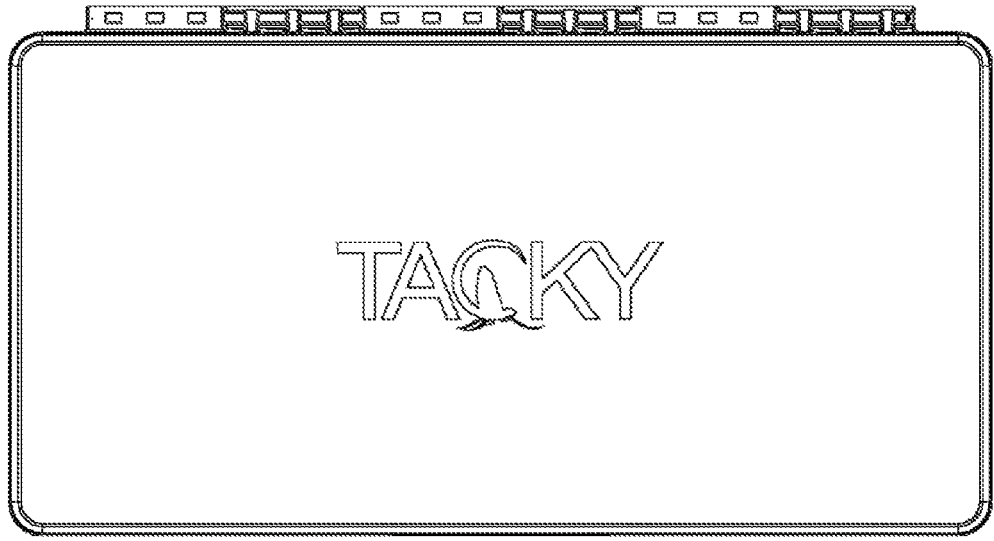
FIG. 10 is a front view of the apparatus of FIG. 9.
Figure 11:
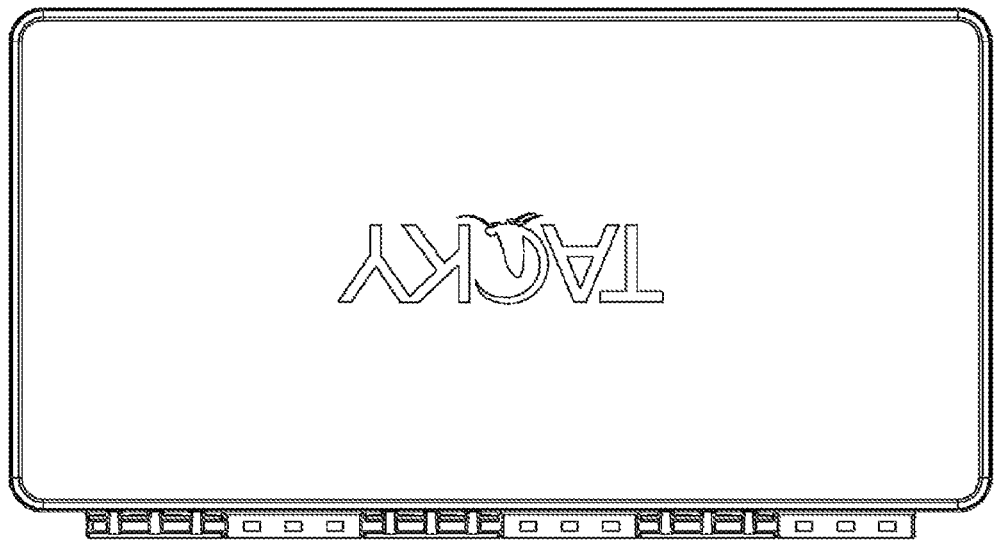
FIG. 11 is a back view of the apparatus of FIG. 9.
Figure 12:
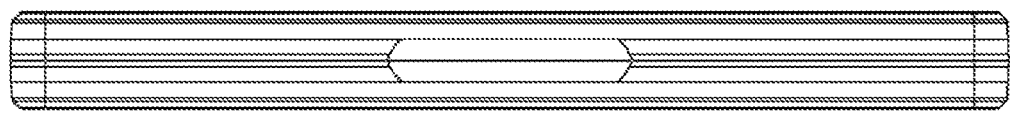
FIG. 12 is one side view of the apparatus of FIG. 9.
Figure 13:
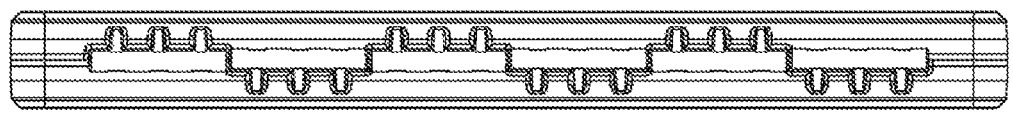
FIG. 13 is an opposite side view of the apparatus of FIG. 9.
Figure 14:
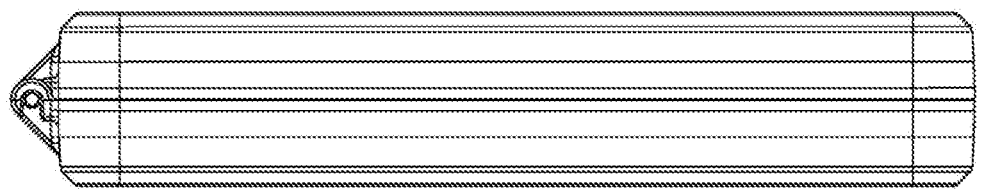
FIG. 14 is a top view of the apparatus of FIG. 9.
Figure 15:
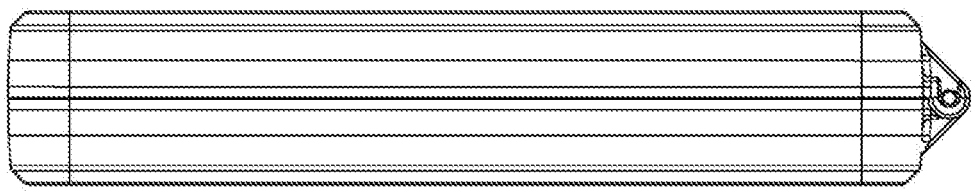
FIG. 15 is a bottom view of the apparatus of FIG. 9.
Figure 16:
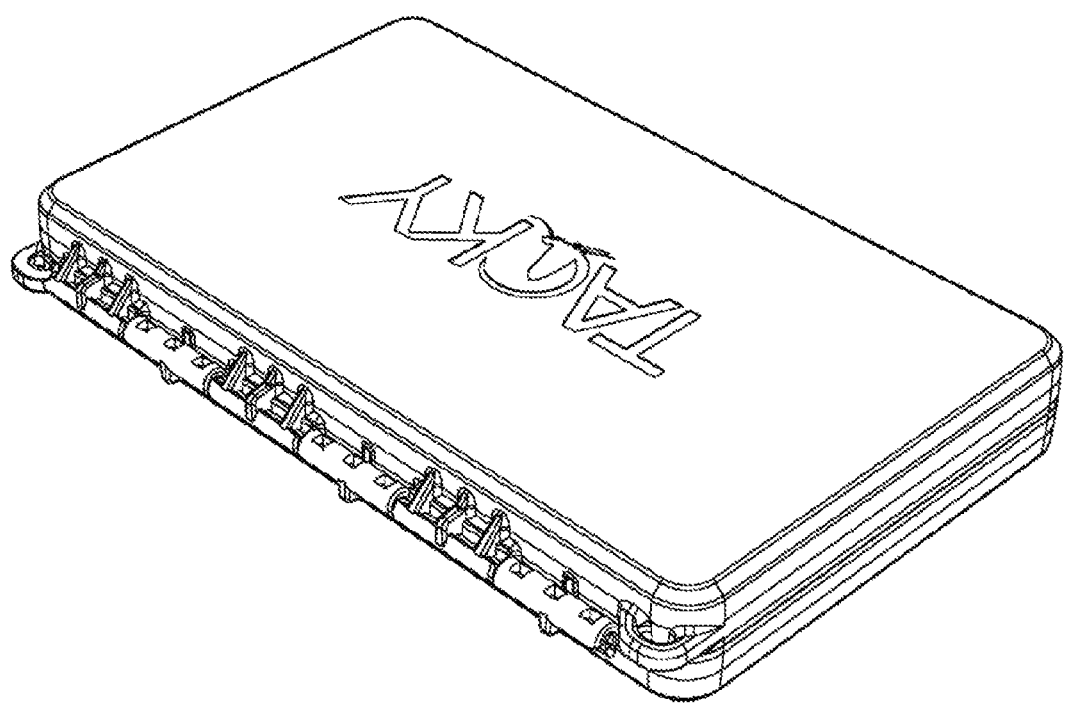
FIG. 16 is a perspective view of the apparatus of FIG. 6 with the cover and base formed of an opaque material and the cover in a closed position.
Figure 17:
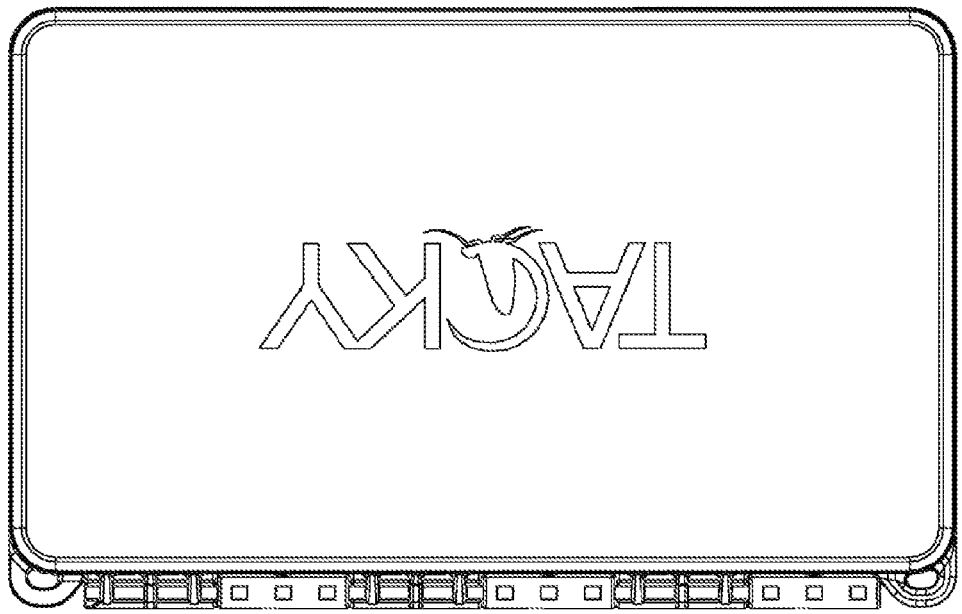
FIG. 17 is a back view of the apparatus of FIG. 16.
Figure 18:
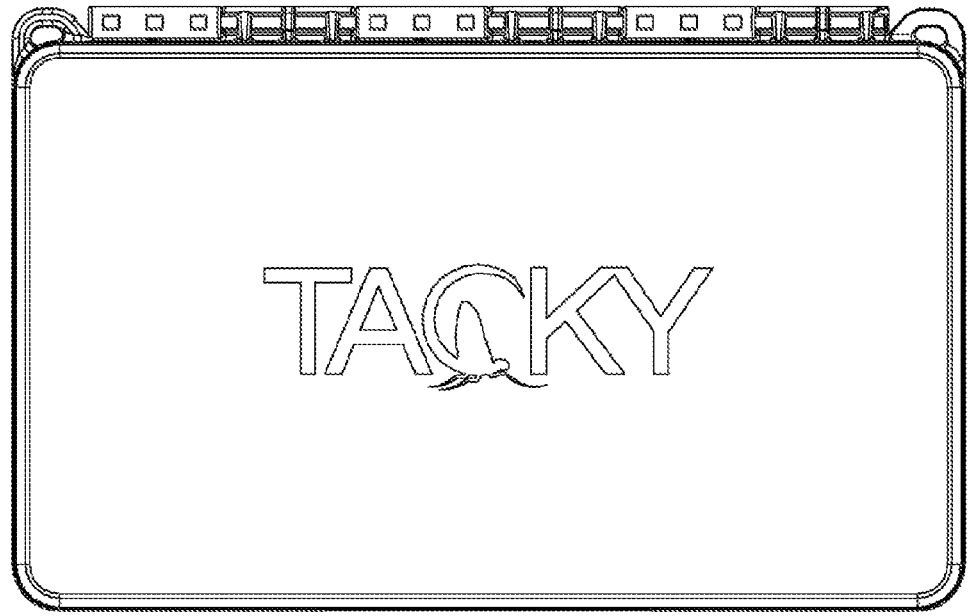
FIG. 18 is a front view of the apparatus of FIG. 16.
Figure 19:
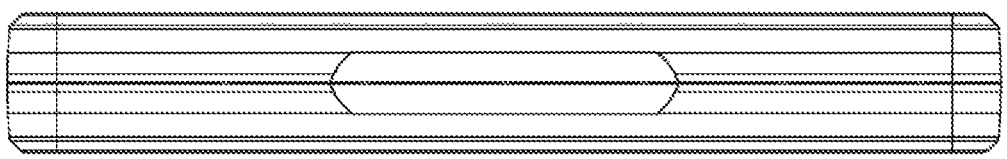
FIG. 19 is one side view of the apparatus of FIG. 16.
Figure 20:
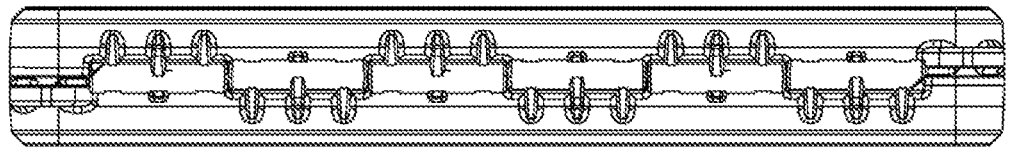
FIG. 20 is an opposite side view of the apparatus of FIG. 16.
Figure 21:
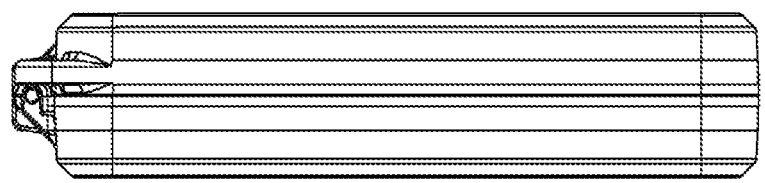
FIG. 21 is a top view of the apparatus of FIG. 16.
Figure 22:
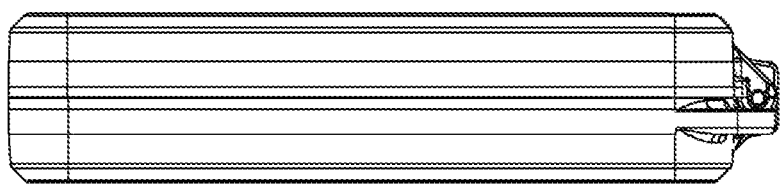
FIG. 22 is a bottom view of the apparatus of FIG. 16.
Figure 23:
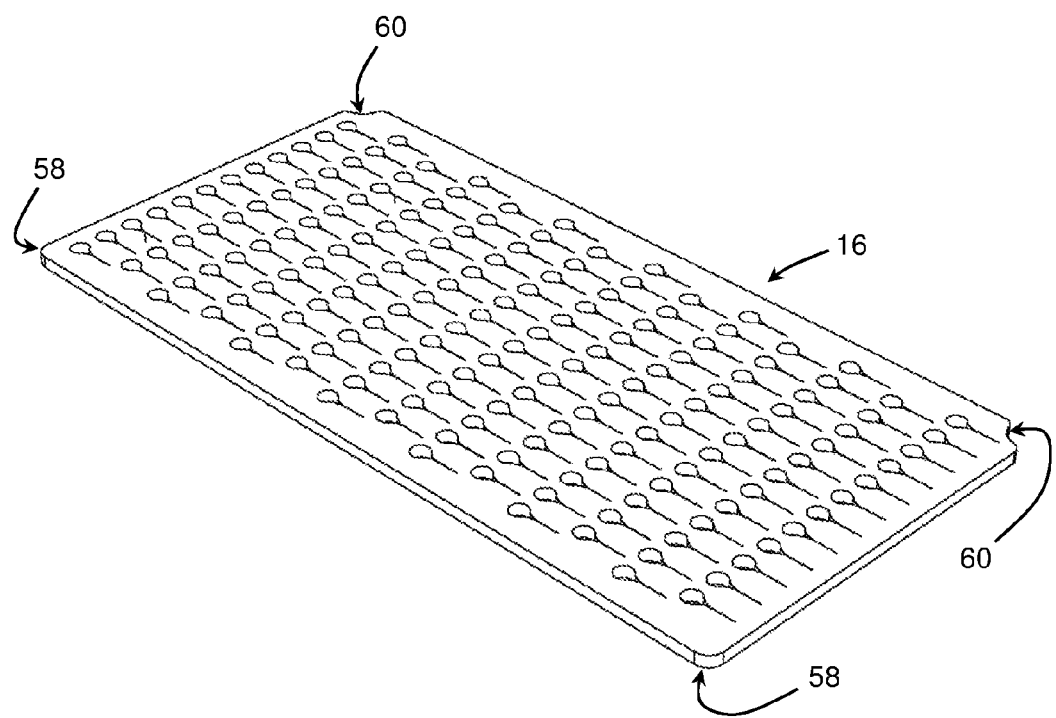
FIG. 23 is a perspective view of the insert corresponding to the apparatus of FIG. 1.
Figure 24:
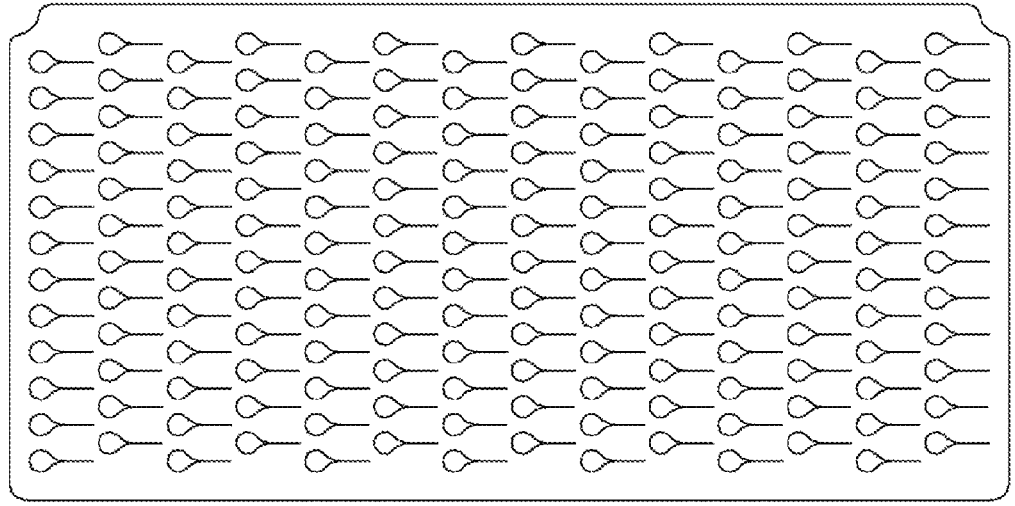
FIG. 24 is a front view of the insert of FIG. 23.
Figure 25:
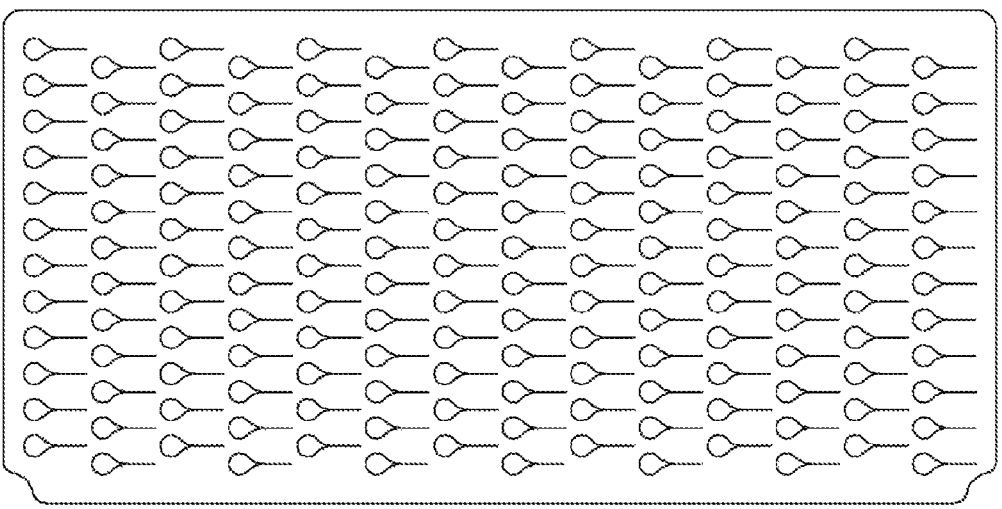
FIG. 25 is a back view of the insert of FIG. 23.
Figure 26:
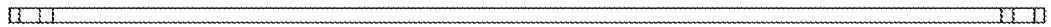
FIG. 26 is one side view of the insert of FIG. 23.
Figure 27:
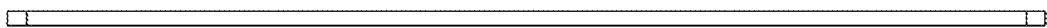
FIG. 27 is an opposite side view of the insert of FIG. 23.
Figure 28:
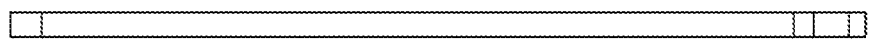
FIG. 28 is a top view of the insert of FIG. 23.
Figure 29:
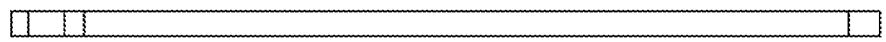
FIG. 29 is a bottom view of the insert of FIG. 23.
Figure 30:
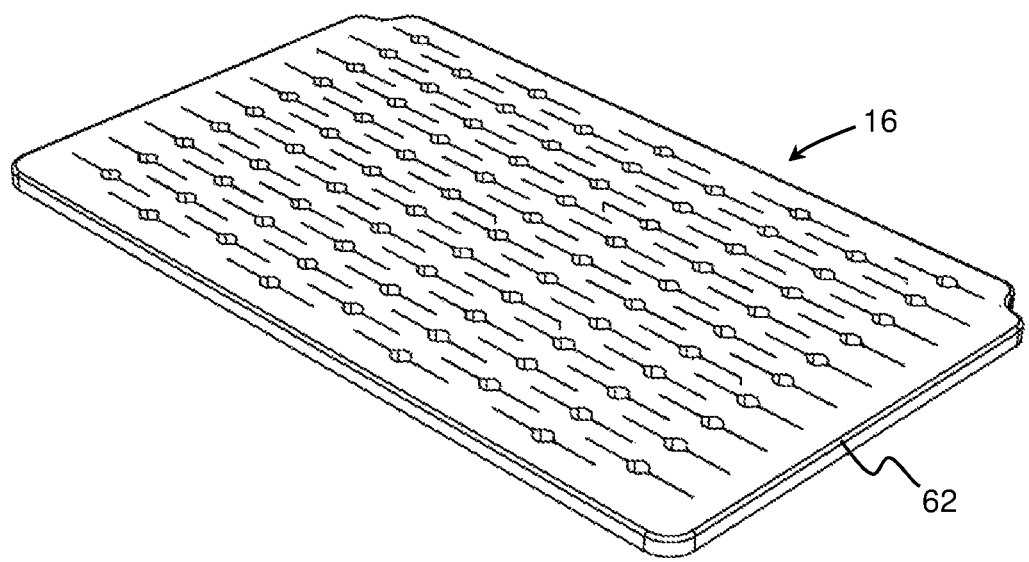
FIG. 30 is a perspective view of the insert corresponding to the apparatus of FIG. 6.
Figure 31:
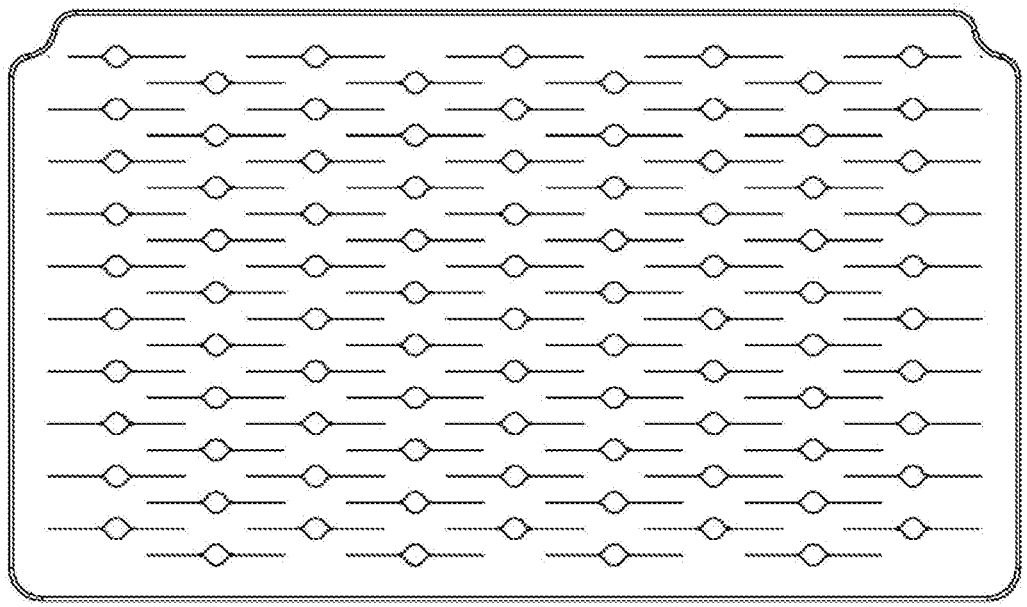
FIG. 31 is a front view of the insert of FIG. 30.
Figure 32:
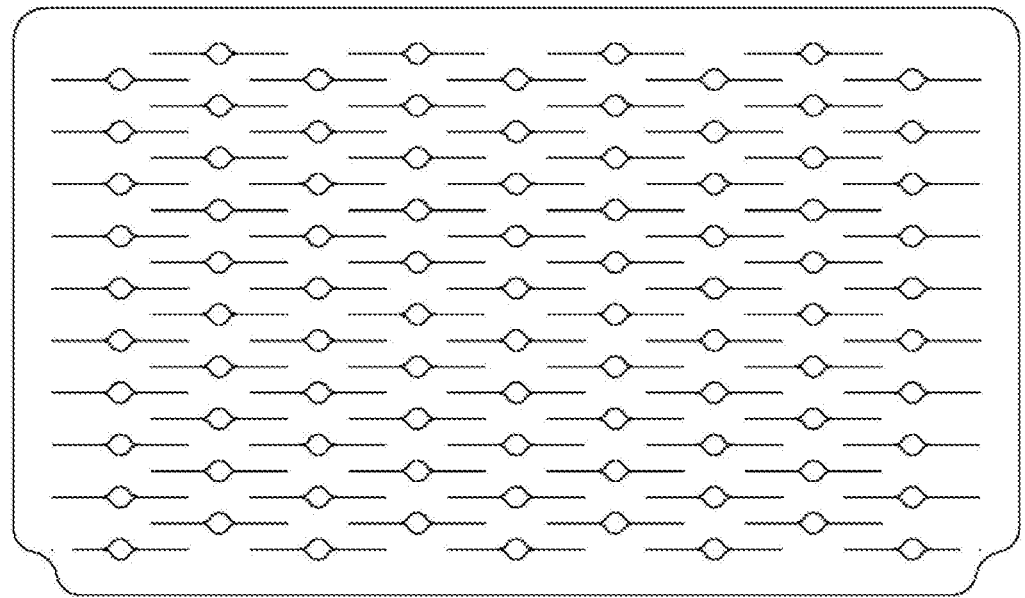
FIG. 32 is a back view of the insert of FIG. 30.
Figure 33:
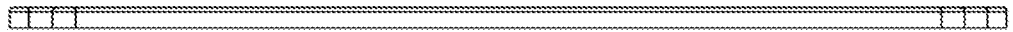
FIG. 33 is one side view of the insert of FIG. 30.
Figure 34:
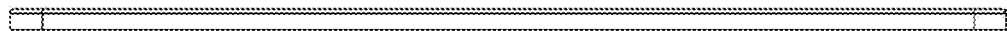
FIG. 34 is an opposite side view of the insert of FIG. 30.
Figure 35:
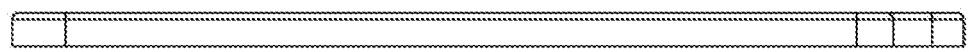
FIG. 35 is a top view of the insert of FIG. 30.
Figure 36:
FIG. 36 is a bottom view of the insert of FIG. 30.
Figure 37:
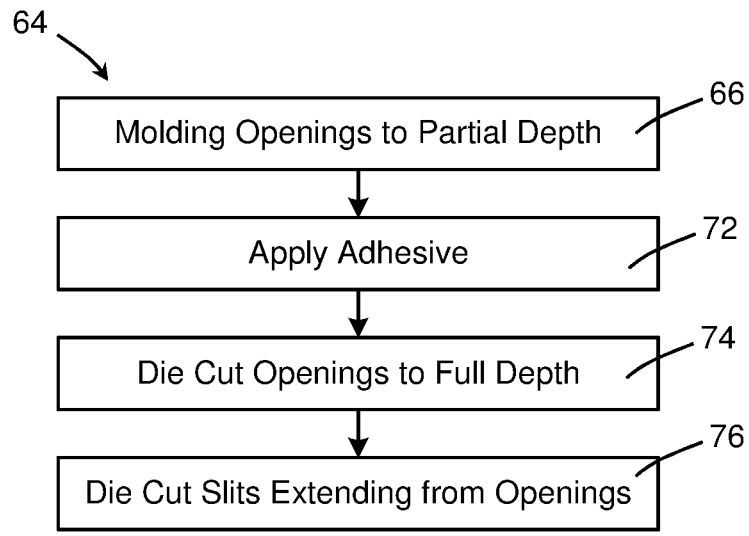
FIG. 37 is a schematic diagram illustrating one embodiment of a method for manufacturing an insert in accordance with the present invention.
Figure 38:
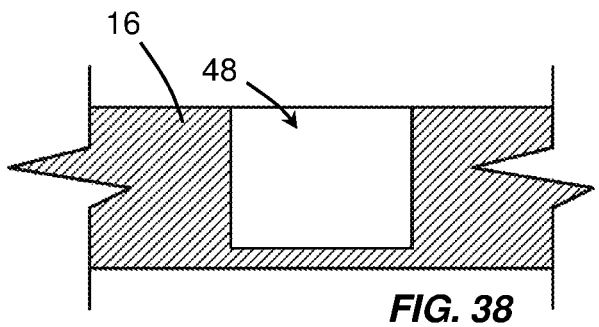
FIG. 38 is a partial cross-sectional view of an insert with a void molded or cast therein extending to a partial depth of the insert.
Figure 39:
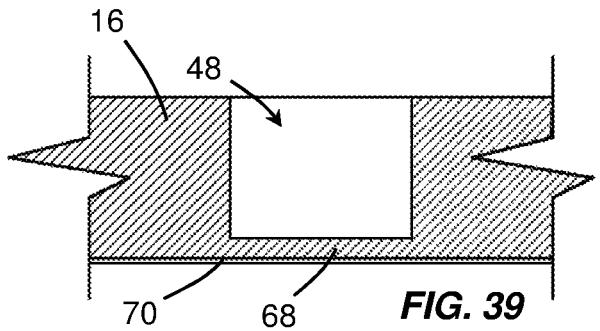
FIG. 39 is a partial cross-sectional view of the insert of FIG. 38 with an adhesive layer applied to the back surface of the insert.
Figure 40:
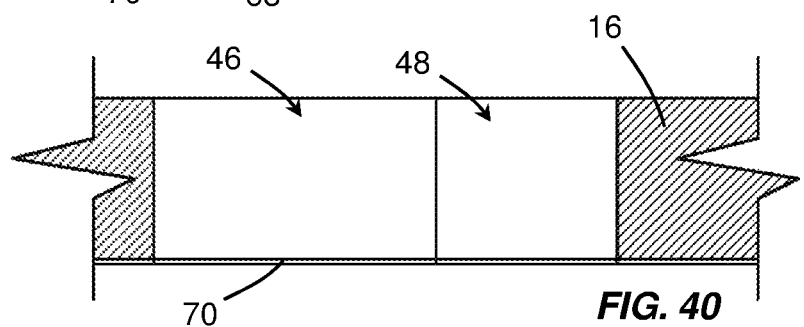
FIG. 40 is a partial cross-sectional view of the insert of FIG. 39 with the void and slit cut completely through to the full depth of the insert and adhesive layer.

Referring to FIGS. 6-8, in selected embodiments, a box 10 in accordance with the present invention may be more compact than the embodiment illustrated in FIGS. 1-3. For example, in certain embodiments, a box 10 may have a length of about 12 to about 14 centimeters extending in a longitudinal direction 11*a*, a width of about 7 to about 9 centimeters in a lateral direction 11*b*, and a thickness of about 1.5 to about 2 centimeters in a transverse direction 11*c*.

In certain embodiments, a box 10 may include one or more apertures 54 for receiving or securing a lanyard, clip, or the like. For example, a base 12 and cover 14 may each include an extension 56 having an aperture 54 extending therethrough. In selected embodiments, such extensions 56 and apertures 54 may be configured such that a cover 14 may be substantially identical to (e.g., produced from the same mold as) a base 12.

Referring to FIGS. 9-22, as set forth hereinabove, a base 12 and cover 14 may have differing transparency or opacity. Alternatively, a base 12 and cover 14 may have the same transparency or opacity. For example, as shown in the illustrated embodiments, a base 12 and cover 14 may both be opaque or substantially opaque. In other embodiments, a base 12 and cover 14 may both be transparent or substantially transparent.

In selected embodiments, one or more inserts 16 may be secured to each of a base 12 and cover 14 of a box 10. That is, one or more inserts 16 may be secured within a base 12 (e.g., adhered or otherwise secured to an interior surface of a back panel 18), while one or more other (e.g., matching) inserts 16 may be secured within a cover 14 (e.g., adhered or otherwise secured to an interior surface of a front panel 22). In such embodiments, both the base 12 and cover 14 may be formed of a material that is opaque or substantially opaque.

Referring to FIGS. 23-29, in selected embodiments, a thickness of an insert 16 may be selected to accommodate the size of tackle to be retained thereby. For example, for certain fishing hooks (e.g., hooks by themselves or hooks of lures or flies, or the like) may be received and secured well within an insert 16 having a thickness of about 0.2 to about 0.4 centimeters. Other larger fishing hooks may be received and secured well within an insert 16 having a thickness of about 0.5 to about 1 centimeters.

An insert 16 may have a perimeter shape that matches or follows the contours of a base 12, cover 14, or other structure to which the insert 16 may be applied. For example, a base 12 or cover 14 may have rounded interior corners. Accordingly, an insert 16 may have rounded corners 58. Similarly, in selected embodiments, a base 12 or cover 14 may include a bulge 34 or widened region 34 to accommodate the first apertures 30. Accordingly, an insert 16 may include a cut out 60 or recess 60 to make space for or to clear such a bulge 34 or widened region 34.

An insert 16 in accordance with the present invention may be provided or marketed without a corresponding box 10. In certain embodiments, an insert 16 may be provided or marketed with an adhesive enabling a user to use or secure the insert 16 to a structure selected by the user. For example, an insert 16 may be sold with double-sided tape (e.g., double-side tape comprising the 300LSE adhesive). Accordingly, a user may secure an insert 16 to a fly tying workbench, car dash, boat, or the like or fit or retrofit some other tackle box to include the insert 16.

Alternatively, an insert 16 may be adhered to a sheet or strip of backing material (e.g., a rigid, semi-rigid, or flexible sheet or strip of backing material). This may be accomplished using the 300LSE adhesive manufactured by 3M or double-side tape comprising the 300LSE adhesive. The backing material may stiffen an insert 16 and make it easier to insert fishing hooks, lures, or flies therein. Accordingly, the insert 16 may store and retain one or more fishing hooks, lures, or flies without regard to where or how the insert 16 itself is stored or used. In certain embodiments, a backing material may form an interface or connection between an insert 16 and some other structure. For example, backing material may be pinned, snapped, sewn, connected using hook-and-loop material, or otherwise connected to a fishing vest, pack, hat, floatation device, boat, or the like.

In selected embodiments, an insert 16 configured for use outside of a box 10 in accordance with the present invention may have square or rounded corners and lack the cut out 60 or recess 60 shown in the illustrated embodiment. For example, the corners shown with the cut out 60 or recess 60 may be shaped like the other corners that lack that cut out 60 or recess 60.

Referring to FIGS. 30-36, in selected embodiments, one or more edges of an insert 16 may be square. Alternatively, as shown in the illustrated embodiments, an insert 16 may have a chamfer, radius, or the like. For example, the perimeter 62 of a front or exterior surface of an insert 16 may be radiused or chamfered to improve the aesthetic appeal or appearance of the insert 16.

Referring to FIG. 37-40, in selected embodiments, an insert 16 may be manufactured by applying an adhesive to a back surface of a sheet of insert material. For example, in certain embodiments, a double-sided tape (e.g., double-sided tape comprising the 300LSE adhesive manufactured by 3M) may be applied to the back surface of the sheet of insert material. In such embodiments, a protective cover or film may be left on an exterior surface of the double-sided tape so as that a manufacturer may continue to easily touch, move, and work with the insert material. Once the adhesive is applied, the sheet of insert material and the adhesive may be die cut (e.g., die cut in one or more passes). In this manner, the outer perimeter, slits 46, and voids 48 or a sub-combination thereof may be cut to form an insert 16. The insert 16 may then be marketed by itself, applied to a backing material, or applied to a box 10.

Alternatively, a process 64 or method 64 of manufacturing an insert 16 may include or comprise molding 66 (or casting) a sheet or strip with one or more voids 48 extending to a partial depth therewithin. That is, as originally molded, cast, or the like, the voids 48 may not extend all the way through a sheet or strip. Accordingly, a strip 68 of material may separate each void 48 and a back surface of the insert 16.

An adhesive layer 70 may then be applied 72 to the back surface of the insert 16. For example, in certain embodiments, an adhesive layer 70 comprising double-sided tape (e.g., double-sided tape comprising the 300LSE adhesive manufactured by 3M) may be applied 72 to the back surface of the insert 16. In such embodiments, a protective cover or film may be left on an exterior surface of the double-sided tape so as that a manufacturer may continue to easily touch, move, and work with the insert 16.

In selected embodiments, with the adhesive layer 70 in place, the voids 48 may be cut 74 (e.g., die cut) completely through to the full depth of the insert 16 and adhesive layer 70. In this manner the strip 68 of material may be removed. Additionally, the slits 46 may be cut 76 (e.g., die cut) completely through the full depth of the insert 16 and adhesive layer 70. In selected embodiments, the cutting 74 of the strips 68 of material and the cutting 76 of the slits 46 may be accomplished in the same pass (e.g., in the same die cutting process). Alternatively, the cutting 74 of the strips 68 of material and the cutting 76 of the slits 46 may be accomplished in the different passes or process.

With the insert 16 formed, the protective cover or film may be removed from the back surface of the double-sided tape. Accordingly, the insert 16 may be pressed against a structure selected by a user, backing material, or an interior surface of a base 12 (e.g., an interior surface of a back panel 18).

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method comprising:
    molding raw material in a mold to form a sheet of elastomeric material comprising at least one indentation;
    the molding wherein the at least one indentation extends at least partially through a thickness of the sheet of elastomeric material;
    cutting, after the molding, at least one slit into the sheet of elastomeric material, the at least one slit having one end terminating in the at least one indentation;
    placing at least a portion of a fishing hook within the at least one slit; and
    gripping, by the sheet of elastomeric material after the placing, the at least a portion of the fishing hook.

2. The method of claim 1, wherein the cutting further comprises extending the at least one indentation through the thickness by cutting the at least one indentation completely through the sheet of elastomeric material.

3. The method of claim 1, further comprising extending the at least one indentation through the thickness by cutting the at least one indentation completely through the sheet of elastomeric material.

4. The method of claim 3, wherein the cutting of the at least one slit occurs at a first time and the cutting of the at least one indentation occurs at a second time that is spaced in time from the first time.

5. The method of claim 1, wherein the at least one indentation has a perimeter shape comprising at least one taper that tapers into the at least one slit.

6. The method of claim 1, wherein the at least one indentation is encircled by an expanse of material forming at least part of the sheet of elastomeric material, the expanse of material having a substantially uniform thickness equal to the thickness of the sheet of elastomeric material.

7. The method of claim 1, wherein the at least one indentation comprises a plurality of indentations, each extending at least partially through the thickness of the sheet of elastomeric material.

8. The method of claim 7, wherein the at least one slit comprises a plurality of slits.

9. The method of claim 8, wherein each slit of the plurality of slits has one end thereof terminating in a different indentation of the plurality of indentations.

10. The method of claim 1, wherein the elastomeric material has a Shore hardness in a range from about 40 A to about 60 A.

11. The method of claim 10, wherein the elastomeric material comprises silicone rubber.

12. The method of claim 1, further comprising:
    obtaining a box that selectively opens and closes; and
    securing, after the cutting, the sheet of elastomeric material within the box.

13. The method of claim 1, wherein:
    the at least one indentation comprises a plurality of indentations; and
    the molding comprises molding the sheet of elastomeric material to include the plurality of indentations such that the plurality of indentations form a plurality of rows, each row of the plurality of rows comprising at least one indentation of the plurality of indentations.

14. The method of claim 13, wherein:
the molding forms each indentation of the plurality of indentations to extend into, but not completely through, the thickness of the sheet of elastomeric material;
the at least one slit comprises a plurality of slits; and
the cutting extends each slit of the plurality of slits into the sheet of elastomeric material such that each slit thereof has one end terminating in a different indentation of the plurality of indentations.

15. A method of forming a fishing box, the method comprising:
obtaining a box that selectively opens and closes;
molding raw material in a mold to form a sheet of silicone rubber comprising a plurality of indentations forming a plurality of rows, each row of the plurality of rows comprising at least one indentation of the plurality of indentations;
the molding wherein each indentation of the plurality of indentations extends at least partially through a thickness of the sheet of silicone rubber;
cutting, after the molding, a plurality of slits into the sheet of silicone rubber, each slit of the plurality of slits having one end terminating in a different indentation of the plurality of indentations; and
fastening, after the cutting, the sheet of silicone rubber within the box.

16. The method of claim 15, wherein the molding comprises forming each indentation of the plurality of indentations to extend into, but not completely through, the thickness of the sheet of silicone rubber.

17. The method of claim 15, further comprising:
placing at least a portion of a fishing hook within a slit of the plurality of slits; and
gripping, by the sheet of silicone rubber after the placing, the at least a portion of the fishing hook.

18. The method of claim 15, wherein the cutting further comprises extending each indentation of the plurality of indentations through the thickness by cutting each indentation of the plurality of indentations completely through the sheet of silicone rubber.

19. The method of claim 15, further comprising extending each indentation of the plurality of indentations through the thickness by cutting each indentation of the plurality of indentations completely through the sheet of silicone rubber.

20. The method of claim 19, wherein the cutting of the plurality of slits occurs at a first time and the cutting of each indentation occurs at a second time that is spaced in time from the first time.

\* \* \* \* \*